Feb. 11, 1936.   G. L. ERICKSON ET AL   2,030,814
TESTING THE SUSCEPTIBILITY OF TELEGRAPH LINES TO INTERFERENCE
Filed June 2, 1932
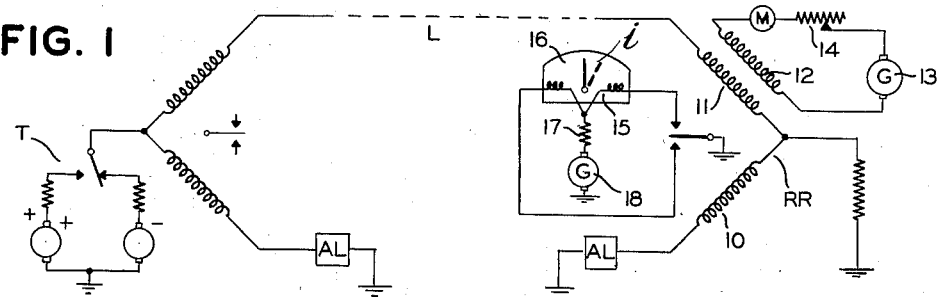
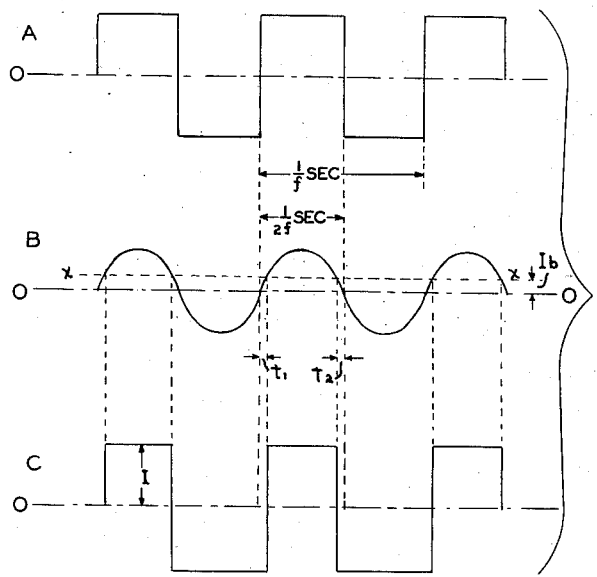
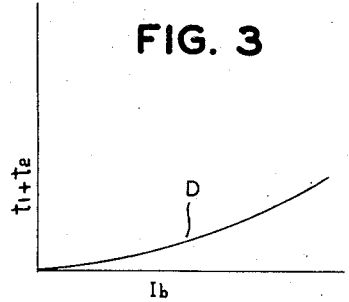
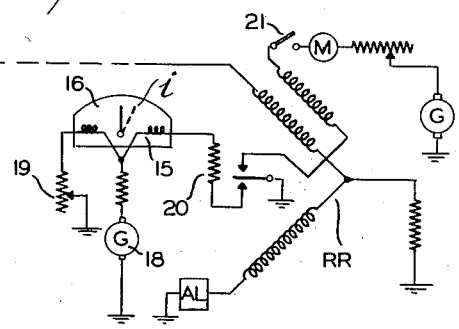
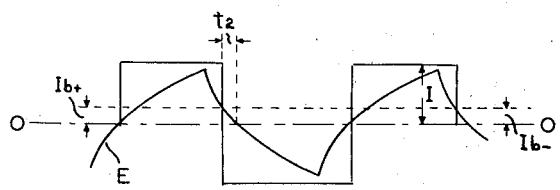
INVENTOR
G. L. ERICKSON
J. J. CHRISTOFFEL
Eugene C. Brown
ATTORNEY Patented Feb. 11, 1936

2,030,814

UNITED STATES PATENT OFFICE 2,030,814

TESTING THE SUSCEPTIBILITY OF TELEGRAPH LINES TO INTERFERENCE

George L. Erickson, Hasbrouck Heights, N. J., and John J. Christoffel, Chicago, Ill., assignors to The Western Union Telegraph Company, New York, N. Y., a corporation of New York Application June 2, 1932, Serial No. 615,020

8 Claims. (Cl. 178—69)

This invention relates to a method of and means for testing the susceptibility of telegraph lines to interference.

Telegraph signals are ordinary applied to the line, by the transmitter in the form of square-topped or block signals but due to the transmission characteristics of the line, they become distorted and rounded in shape so that in long lines the received signal impulses may have a long sloping rise and fall. Consequently, the receiving relay instead of being decisively operated by sharp, clean cut reversals must operate at some point along the sloping rise and fall of the signal wave. The operating point of the relay is critical depending on a definite current value and therefore, due to the gradual rise and fall of the received signals, the addition of a small amount of extraneous current in the telegraph wire causes a considerable shifting in the operating point of the relay. The tongue of the relay is thus caused to rest for a longer or shorter time on one of its contacts with consequent lengthening or shortening of the repeated signal impulse.

The susceptibility of the line to interference may be said to be dependent upon the rate of rise and fall of the received signal impulses. In the absence of interference the shape of the incoming wave is substantially uniform, depending upon line characteristics and a determination of the slope of such waves gives an indication of the susceptibility of the line to interference from which the transmission qualities of the line for any given level of interference can be computed. It is, of course, possible to calculate the arrival curve of an impulse sent over any line if the constants of the line and the receiving apparatus are accurately known, or an oscillograph may be used. However, in general field application it is inconvenient to employ an oscillograph and difficult to determine line characteristics accurately.

One of the objects of the present invention is, therefore, to provide a method of determining the interference susceptibility characteristic of a telegraph line, by simple, direct measurements.

Another object is to provide a method of and apparatus for quickly and easily procuring data for plotting curves indicative of the susceptibility of the line to interference.

A still further object is to enable the susceptibilty to line interference of either the rise or the fall of the signal wave, to be obtained.

Other objects and advantages of the invention will hereinafter appear.

In accordance with our invention we terminate the line to be tested in a standard telegraph terminal set arranged to operate on polar signals such as, for instance, a differential polar duplex set which repeats the signals to a differential meter which, as is well known, integrates the repeated signals, so that with current alternations transmitted over the line the meter needle stands at zero in the absence of interfering currents. The line relay is also provided with a biasing winding through which various biasing currents may be applied to the relay to simulate different levels of interfering currents. From the meter reading with various biasing currents flowing in the relay winding, a simple calculation may be made, as will subsequently appear, from which a figure for the susceptibility of the line to extraneous interference can be determined.

The invention will be best understood by reference to the accompanying drawing wherein:

Fig. 1 shows diagrammatically a duplex telegraph line having mechanism for carrying out the present invention applied thereto;

Fig. 2 shows examples of three sets of telegraph signals representing respectively, transmitted signals, received signals and repeated signals, Fig. 3 is a curve showing the relation of the time variation of the signals at various levels of interfering current;

Fig. 4 shows a testing arrangement, associated with one terminal of a duplexed line, for measuring the time variation at one end only of a signal impulse, and Fig. 5 shows curves representing respectively the arrival curve of an unsymmetrical signal and the resulting repeated signal.

Referring first to Fig. 1, an ordinary grounded telegraph line L is shown terminating in a standard differential duplex terminal set. Only so much of the apparatus is shown as is necessary for an understanding of the invention. Such apparatus includes a pole changing transmitter T at one terminal of the line, for transmitting current reversals and a receiving relay RR at the other end of the line, having differential windings 10 and 11 and a biasing winding 12. The biasing winding is in circuit with a source of potential 13, a variable resistance 14 and a meter M. The tongue of the relay RR is grounded and its contacts are connected to the opposite terminals of the differential winding 15 of a recording milliammeter 16. The midpoint of the winding 15 is connected through a resistance 17 to a grounded source of potential 18. The meter 16 is of the integrating type so that with no current in the biasing winding 12 and current alternations being transmitted over the line, the meter reading will be zero. However, if a bias is applied to the winding 12, the relay tongue will rest for a longer period on one contact than the other and consequently more current will flow through one side of the winding 15 than through the other. The resulting meter reading will be a measure of the applied bias.

It will be understood that the biasing winding 12 is provided for the purpose of simulating interfering currents of different levels coming in from the line along with the signals. The biasing current is varied by the means of resistance 14.

In Fig. 2 curve A shows the usual form of square topped reversals provided by the transmitter T at the left end of the line. Due mainly to the capacity, inductance and resistance of the line L and the receiving instruments, these signals, when they reach the opposite terminal, are distorted and rounded off so that in an extreme case they may occur in the form shown in curve B. In this curve we have illustrated a signal wave of symmetrical form, in which the rise and fall occur at substantially the same rate. As stated in the absence of interference these signals would be repeated into the differential meter 16 without bias and the meter reading would stand at zero. If now a biasing current be applied to the winding 12 of a value $Ib$, the relay RR would be biased toward one of its contacts, which in effect would result in a shifting of the zero line 0—0 of the signal from its true position a distance proportional to the biasing current. This is represented in curve B by the line X—X. It will be evident, therefore, that signals of positive polarity repeated by the relay RR will be shortened at the forward end by a distance $t_1$ and at the opposite end by a distance $t_2$ and the negative signal will be correspondingly lengthened. The shape of the repeated signals is represented by curve C. The variations in length between the positive and negative signals is twice the sum of the distances $t_1$ and $t_2$. The reading of the meter 16 will indicate the amount of this deviation of the signals from their normal length, the time deviation $t_1+t_2$, of an impulse from normal being proportional to the meter reading "$i$" divided by the steady state current reading I. The length of a single pulse is $$\frac{1}{2f}$$

seconds, where $f$ is the frequency of the transmitted current alternations.

Hence the deviation is found to be:

$$t_1+t_2=\frac{i}{I}\times\frac{1}{2f}=\frac{i}{2If} \text{ seconds}$$

If a series of such readings be taken for different values of biasing current, the slope of the received current wave could be obtained, assuming the rise and fall to be symmetrical, that is, if $t_1$ is equal to $t_2$. If the rise and fall is not symmetrical $t_1$ and $t_2$ will have different values, but in any case the susceptibility to interference is found to be proportional to the sum of $t_1$ and $t_2$ and, therefore, it is preferable to plot the sum of these values against the biasing current to secure a curve D, of the form shown in Fig. 3. This curve represents the time loss suffered by a signal in the presence of interfering currents $Ib$ of different levels.

While we have produced the interfering current artificially by the biasing winding 12, it is to be understood that interference induced in the line from adjacent conductors similarly effects the relay RR, sharp peaks of interference producing substantially the same time loss as that produced by the steady test current, so that susceptibility of the line to such interference is fairly accurately represented by the curve D. While we have determined the time deviation by a simple calculation from the meter reading, it will be evident that for a definite frequency and value of the current I, the meter may be calibrated to read time deviations directly.

If it is desired to independently explore both the rise and fall of an unsymmetrical signal, such as that shown by wave form E in Fig. 5, the biasing circuit is altered as shown in Fig. 4. In this arrangement the biasing winding is grounded through the upper contact and tongue of the line relay RR and one terminal of the winding 15 of meter 16 is grounded through the adjustable resistance 19, the opposite terminal being grounded through the resistance 20 and lower contact of the relay RR.

In this case the relay is biased only when its armature is on its upper contact so that the signals deviate from their normal length only on one side, that is, either during the rise or fall. In the instance shown the connections are such as to produce a time deviation $t_2$ on the falling side of the signal. The value of $t_2$ may be obtained as follows. While receiving current alternations with the switch 21 open, the resistance 19 is adjusted until the meter reading is zero. Under this condition the steady current through the left half of the meter winding will be just equal to the current which flows over the lower contact of the relay, integrated for the time of one cycle, that is, half of the current I which flows over the right hand winding when the relay tongue rests on its lower contact or $$\frac{I}{2}$$

Now with the switch 21 closed and a biasing current $Ib$ flowing in such direction as to bias the tongue towards its upper contact, the current in the righthand side of the meter will be decreased by an amount depending upon the resulting shortening of the positive impulse or $$\frac{t_2 I}{\frac{1}{f}}$$

With the current in the left winding equal to $$\frac{I}{2}$$

and that in the right winding equal to $$\frac{I}{2}-\frac{t_2 I}{1/f}$$

the reading $i_2$ of the meter may be expressed in the following terms:

$$i_2=\frac{I}{2}-\left(\frac{I}{2}-\frac{t_2 I}{\frac{1}{f}}\right)$$

From this equation it will be seen that the time deviation $$t_2=\frac{i_2}{If}$$

This latter value represents a shortening of the rear side of the positive impulse or a lengthening of the foreside of a negative impulse. Similarly the deviation $t_1$ at the front side of the impulse, for the same value of biasing current, will be $$t_1 = (t_1 - t_2) - t_2$$
$$= \frac{i_1}{2If} - \frac{i_2}{If}$$
$$= \frac{\frac{i_1}{2} - i_2}{If}$$

From these equations separate curves may be plotted, similar to curve D, showing the time deviation from normal of each side of an impulse, for different levels of interfering currents.

Having now a measure of the susceptibility of the circuit to interference the actual transmission quality can be ascertained by determining the maximum levels of interference suffered on this particular line. This is generally accomplished by what is known as a "Break over" test, which may be accomplished in many ways, a preferred method being fully shown in a copending application of G. L. Erickson, et al, Serial Number 618,567, filed June 21, 1932, and entitled Measurement of telegraph interference for measuring telegraph interference. These tests briefly consist in applying a biasing current to the receiving relay in the manner shown in Fig. 1, while the line is idle and increasing this current slowly to a value where the relay is barely unaffected by interference peaks. The value of the interference peak can then be read in milliamperes on the meter 15 in the biasing circuit. Applying this value to the curve D of Fig. 3 the maximum change in length, or time loss, which a signal may undergo, can be readily ascertained. The per cent signal loss "$t_0$" may then be expressed $$t_0 = \frac{t_1 + t_2}{\frac{1}{2f}} \times 100 = 200 f(t_1 + t_2)$$

This latter figure may be regarded as a measure of the transmission quality of the circuit at normal telegraph speeds.

It is usually possible to make satisfactorily accurate bias readings on the meter 16 in spite of the normal interference on the line. If this interference is too severe, however, it can be neutralized by substituting for the artificial line AL, an actual line parallel to the conductor under measurement and similarly terminated at the distant end.

For measurements in absolute terms the biasing winding 12 should be identical with the two main line windings, but where the measurements are made with, and for use with standard terminal sets, which use a standard relay, the results will be generally applicable regardless of whether these windings are similar.

This method of measuring the quality of telegraph circuits is not confined to direct current grounded telegraph systems, as shown, but is equally applicable to metallic circuits, carrier current systems, or any other type which employ a receiving relay. Therefore, we do not desire to be limited to the exact details shown and described, but contemplate all changes and modifications that come within the spirit and terms of the appended claims.

What we claim is:

1. The method of determining the susceptibility of a telegraph line to interfering currents comprising applying signals to the line circuit, consisting of alternate marking and spacing conditions of uniform period, biasing said line circuit to simulate a definite level of interference, repeating the signals, measuring the effect of said bias on the circuit by integrating the difference produced thereby in the marking and spacing conditions and utilizing said measurement to compute the departure of said signals from their original length due to said simulated interference.

2. The method of determining the susceptibility of a telegraph circuit to interfering currents comprising transmitting alternate electrical conditions of uniform period over the circuit, biasing the receiving signal conditions to simulate a definite level of interference and applying the received signals to an integrating device to determine the deviation in length of the received signals from the transmitted length thereof.

3. The method of measuring the deviation in length at either end of a telegraph signal received over a telegraph circuit, due to interference comprising transmitting alternate electrical conditions over the circuit, repeating one only of said conditions, utilizing the repeated conditions to create a magnetic field, neutralizing the effect of magnetic field created by said condition by a steady magnetic field, then biasing said circuit to simulate different levels of interference only during the reception of the opposite one of said conditions and utilizing the average difference in said magnetic fields to determine the variation in length between said conditions.

4. The method of measuring the deviation, due to interference, in the length at either end of a telegraph signal received over a circuit comprising transmitting alternating electrical conditions over said circuit, biasing the circuit to simulate different levels of interfering currents during the reception of one only of said conditions and measuring the effect of said bias on the circuit by integrating the difference produced thereby in said alternating electrical conditions whereby to determine the average difference in length between the conditions due to said biasing current.

5. In a telegraph circuit, means for measuring the susceptibility of the circuit to interfering currents comprising a transmitter at one terminal for sending alternate electrical conditions over the circuit, an integrating meter at the opposite terminal, a receiving relay arranged to repeat one only of said conditions to the meter and means for biasing said circuit to simulate different values of interfering currents during the reception of the opposite electrical condition.

6. In a telegraph circuit, means for measuring the susceptibility of the circuit to interfering currents comprising a transmitter at one terminal of the circuit for sending alternate electrical condition over the circuit, an integrating device at the opposite terminal, a receiving relay arranged to repeat one only of said conditions to the integrating device, a biasing winding for said relay and means for varying the current in said biasing winding, to simulate different values of interfering currents, during the reception of the opposite electrical condition.

7. The method of predicting the liability to distortion from interference of telegraph signals sent over a transmission medium, which consists of transmitting uniform signal reversals of known length over said medium, in the absence of interference, biasing said medium to simulate the effect of interference, measuring the effect of said bias on the circuit by integrating the difference produced thereby on the signal reversals and constructing from the resulting measurement and the biasing currents a characteristic expressive of the deviation in length of the telegraph signals under the influence of various levels of interference.

8. In a telegraph system, means for measuring the susceptibility of the circuit to interference comprising a transmitter at one terminal of the circuit for transmitting alternate electrical conditions of uniform period over the circuit, a receiving line relay, means for biasing the receiving line relay to simulate a definite level of interference, an output circuit for said relay, and an integrating meter in said output circuit arranged to measure the deviation in length of the repeated signals from the transmitted length thereof.

GEORGE L. ERICKSON.
JOHN J. CHRISTOFFEL.